United States Patent [19]

Moumaneix et al.

[11] 4,208,571
[45] Jun. 17, 1980

[54] HEAT SHIELDED HANDLE FOR AN ELECTRICALLY HEATED HAND TOOL

[75] Inventors: Francis Moumaneix, Le Raincy; César Marietta, Saint leu la Foret, both of France

[73] Assignee: Anciens Etablissements Leon Guilbert & Fils, Paris, France

[21] Appl. No.: 855,704

[22] Filed: Nov. 29, 1977

[30] Foreign Application Priority Data

Dec. 14, 1976 [FR] France .......................... 76 37595

[51] Int. Cl.² .................. H05B 1/00; B23K 3/04
[52] U.S. Cl. .................. 219/227; 16/116 R; 156/579; 219/238; 219/531; 219/533; 228/55
[58] Field of Search .................. 219/221–243, 219/533, 531; 38/90, 93; 156/579, 583; 228/51–55; 16/116 R

[56] References Cited

U.S. PATENT DOCUMENTS

| | | | |
|---|---|---|---|
| 1,324,969 | 12/1919 | Kuhn et al. | 219/227 |
| 2,092,313 | 9/1937 | Huffman | 38/90 |
| 2,179,818 | 11/1939 | Hampton et al. | 219/239 |
| 2,187,806 | 1/1940 | Moulthrop | 219/230 |
| 2,219,649 | 10/1940 | Hayes et al. | 219/230 |
| 2,391,065 | 12/1945 | McKinley | 219/230 |
| 2,447,649 | 8/1948 | Harrison | 219/239 X |
| 2,574,440 | 11/1951 | Smith et al. | 219/238 X |
| 2,693,295 | 11/1954 | Fasano | 16/116 R X |
| 2,935,592 | 5/1960 | Thuillier | 219/239 |

FOREIGN PATENT DOCUMENTS

| | | | |
|---|---|---|---|
| 513087 | 8/1952 | Belgium | 219/227 |
| 559249 | 2/1944 | United Kingdom | 219/239 |

Primary Examiner—A. Bartis
Attorney, Agent, or Firm—Young & Thompson

[57] ABSTRACT

A hand tool for heating a workpiece includes an elongated electric heating element, a heat applying member conductively connected at one end of the heating element and in alignment therewith, and an elongated cover surrounding and spaced from the heating element. The heating element and heat applying member are connected to the cover adjacent only one end of the cover, with the connection defining the sole heat conductive path therebetween. A handle is disposed at generally right angles to the cover. A relatively wide bent bracket member, including a hair-pin shaped portion, substantially coextensive in length with the cover and disposed between the cover member and handle, connects the handle to the cover solely at the opposite end of the cover. The cover dissipates heat throughout its length and the bracket is wide enough to shield the handle from the heat dissipated by the cover. Thus the cover and bracket member shield the handle from heat generated by the heating element with the tool is in operation.

13 Claims, 7 Drawing Figures

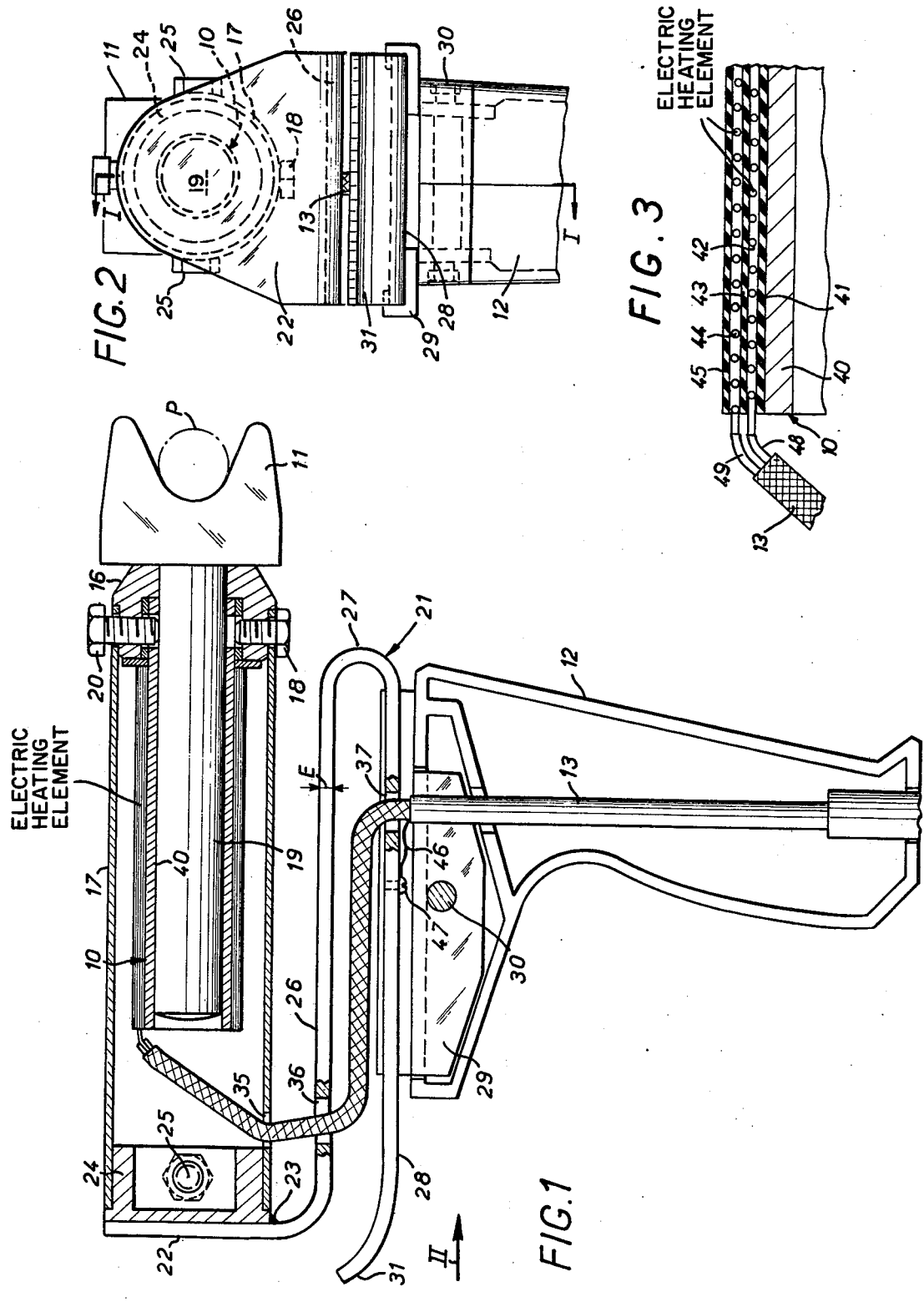

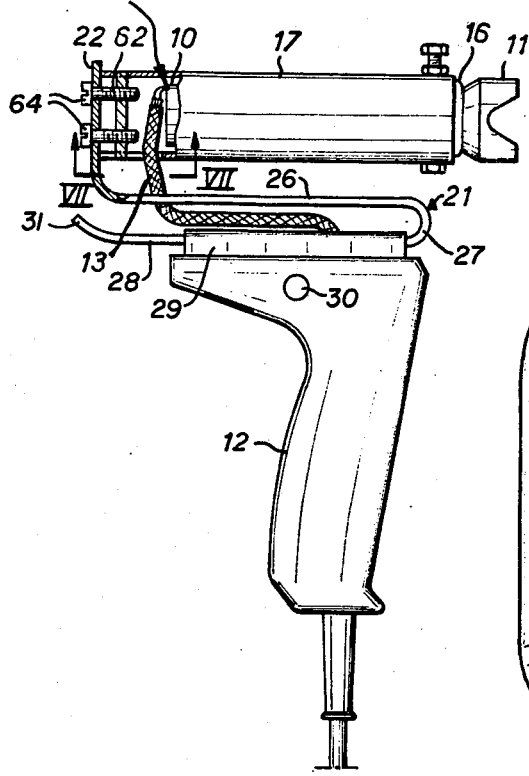
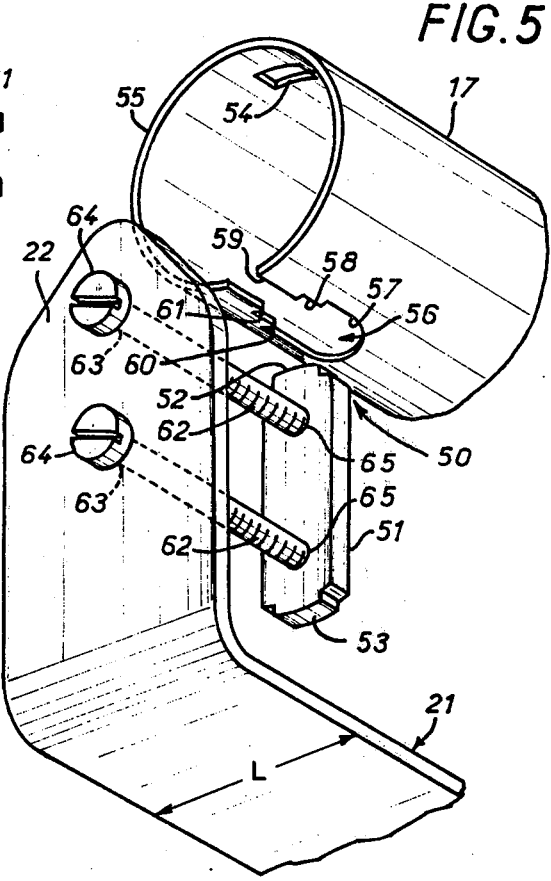
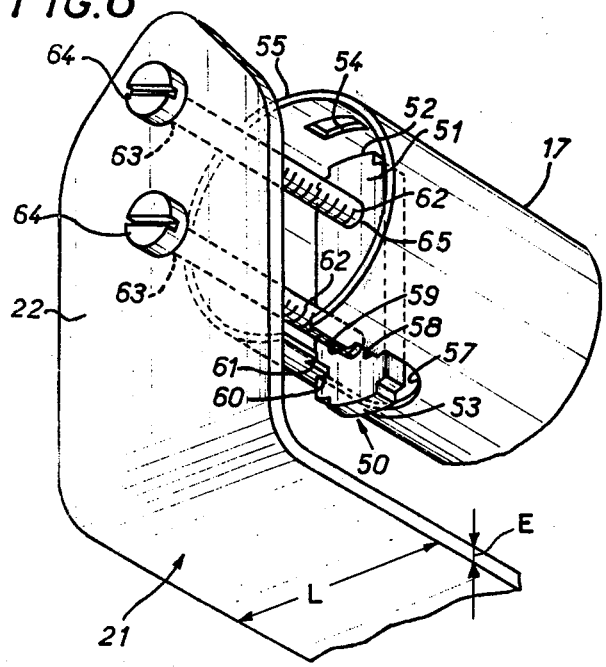
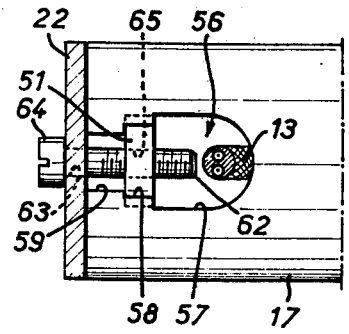

HEAT SHIELDED HANDLE FOR AN ELECTRICALLY HEATED HAND TOOL

This invention relates to a hand tool imparting heat to a workpiece by contact.

Generally, thermal hand tools are of large size, which is detrimental to operating precision, or their handles are poorly protected from heat, which is liable to cause discomfort to the operator.

This invention has as a principal object the provision of a hand tool imparting heat by contact, which is of compact design and which has excellent sensitivity and manoeuvrability, thus permitting accurate work without any danger of heat causing discomfort to the hand holding the handle.

In accordance with the invention, a hand tool for heating a workpiece is provided, comprising an elongate heating element, a heat applying member conductively connected at one end of the heating element and in alignment therewith, and a cover member extending around and generally parallel to the heating element. The heating element and said heat applying member are mounted at one end of said cover member and define the sole heat conductive connection therebetween. A handle is disposed generally at right angles to the heating element, and a relatively wide, bent bracket member is connected in heat conductive contact with said cover member solely at an opposed end thereof. This cover member is adapted to dissipate heat along its length from its one end to its opposed end, said cover member and said bracket member shielding the handle from heat generated when said hand tool is in operation.

In accordance with a preferred feature the wide bent bracket member comprises a first portion parallel to the cover and spaced apart therefrom, and a second portion in continuation of the first portion which second portion is bent over parallel on to the first portion in hairpin fashion and to which said handle is attached.

This arrangement makes it possible to increase in a simple and compact manner the thermal protection of the handle both against radiation and conduction.

Two embodiments of the invention are described below, by way of example, with reference to the accompanying drawings, in which:

FIG. 1 is a view in longitudinal section along the line I-I in FIG. 2 of a thermal hand tool in accordance with the invention;

FIG. 2 is a view from behind of this tool in the direction of the arrow II—II in FIG. 1;

FIG. 3 shows on enlarged scale a partial view of the heating element and its electric-power supply;

FIG. 4 is a general view in elevation, partly in section, of a modified thermal hand tool;

FIG. 5 is an exploded view in perspective, on an enlarged scale, of lockable attachment means of the tool of FIG. 4;

FIG. 6 is a similar view to FIG. 5 but in another position;

FIG. 7 is a view of the lockable attachment means, in horizontal section along the line VII-VII in FIG. 4.

In the embodiment illustrated in FIGS. 1 to 3 a thermal hand tool, for example, a soldering iron comprises a heating element 10 of elongate cylindrical shape, a heat applying member consisting of a bit 11 arranged coaxially at the front end of the element 10, and a grip handle 12.

The heating element 10 may be a single or multiple winding according to power requirement and is illustrated as a double winding 42 and 44 in FIG. 3.

The heating element 10 comprises (FIG. 3) a cylindrical support tube 40 around which are disposed in successive and concentric layers: an inner insulating lining 41; a first winding 42 of conducting wire; an intermediate insulating lining 43; a second winding 44 of conducting wire 44 and an outer insulating lining 45.

The supply of electric power to the windings 42 and 44 is conveyed through a flex or cable 13 passing through the handle 12 and having an earth wire 46 grounded at 47 on the handle 12, and two conducting wires 48 and 49 respectively connected up to the two windings 42 and 44 at one end of the tube 40. Said windings 42 and 44 are directly connected up to one another at the other end of the tube 40.

The heating element composed of the members 40, 41, 42 43 and 45 and designated in its entirety by 10 is designed to be brought to a high temperature, for example in the order of 650° C. when the cable 13 is live.

The support tube 40 is firmly secured at its front part to a annular mounting ring 16. A heat-insulating cover 17 is also mounted on the ring 16 and is fixed thereto by one or more screws 18. The cover 17 completely surrounds the heating element 10. The bit 11 is securely fastened to a shank 19 which is designed to be fitted inside the support tube 40 of the heating element 10, so as to receive all the heat. The shank 19 is also securely fastened to the ring 16 by one or more screws 20.

Instead of the handle 12 being located at a distance behind the heating element 10 and directed coaxially with this latter as in some known thermal hand tools, said handle is arranged beside the heating element 10 and extending substantially perpendicular to the element 10, being spaced apart therefrom.

A thin and rigid intermediate metal support bracket 21 interconnects the handle 12 and the rear of the cover 17, this latter itself being connected to the ring 16 attached to the heating element 10 and to the bit 11.

In particular, the support 21 consists of a flat section member bent generally in the shape of a hair-pin. One end 22 of the interconnecting support 21 is bent over at right angles and fastened at the rear end of the cover 17. The end 22 is fastened, for example, by welding at 23, on to a ring 24 which is secured to the cover 17 by screws 25. The support 21 has a first segment or portion 26 which is adjacent to the end 22 and which extends parallel to the heating element 10, being spaced apart both from the cover 17 and from the handle 12. The 180° curve in the hair-pin-shaped support 21 is designated 27 and is located at the front of the tool, while a second segment or portion 28 of the support 21 extends rearwards and has secured thereto the handle 12 by means of a clamp mounting 29 locked by a screw 30.

The rear end of the segment 28 is extended beyond the handle 12 and is curved at 31 so as to form a support rest in the inoperative position.

The heating element thus formed has the advantageous feature that the handle 12 is situated at a small distance from the bit 11, e.g. a few centimeters, which allows very accurate operation.

Moreover, the hand holding the handle 12 is not in danger of being subjected ot the heat emitted by the heating element 10 and by the bit 11.

In fact, the handle 12 is spaced apart from the heating element 10. As a result of its configuration, the support 21 transmits by conduction only a small amount of heat.

Furthermore, the handle 12 is protected against radiation from the element 10 by the cover 17 and likewise by the intermediate segment 26. As for the bit 11, its radiation does not directly affect the handle 12, since the latter is arranged at right angles to the element 10 and is set back from the bit 11.

The segment 26 forms a particularly effective shield protecting the segment 28, the electric cable 13, the handle 12 and the operator's hand.

The flex 13 passes through a hole 35 in the rear of the cover 17, then through a hole 36 in the rear of the segment 26 and extends forward in the space between the segments 26 and 28, then passing through a hole 37 in the front of the segment 28 and enters the handle 12.

The wire 46 is earthed at 47 beneath this segment 28.

The section member forming the support 21 is, preferably, of relatively large width L, e.g. 50 mm, and of small thickness E, e.g. 3 to 4 mm so that the ratio L:E is in the range 12:1 to 17:1. This section member is advantageously subjected to a treatment which causes it to become shiny so as to reflect radiation energy and prevent it being converted into thermal energy. The various materials of the components 17 and 21 located between the ring 16 and the handle 12 may, in particular be refractory, for example of stainless steel with or without nickel.

It is to be noted that the front end 27 of the hair-pin-shaped support 21 forms a stop member for the mounting 29, lest the fastening between the arm 28 and this mounting 29 permits sliding when the bit 11 is applied forcefully on to the workpiece to be heated.

The curved end 31 of the arm 28 enables the tool to be rested on a support surface, for example a table, in conjunction with the handle 12 being in contact with this support surface. The rear curve 31 also constitutes the coolest metal part of the appliance, in the order of 30° to 40° C., which allows the appliance to be rested on any support surface without danger of burning.

It is to be noted that the appliance just described has a thermal reserve such that, without any danger of discomfort to the hand, it can carry out a dozen soldering operations after disconnecting the cable 13, if required.

Referring now to FIGS. 4 to 7, in which a modification is shown, the support 21 is fastened to the cover 17 by lockable attachment means, generally designated 50 (FIG. 5).

The lockable attachment means 50 comprise a small diametral bar 51 having two lugs 52 and 53, one at each end. The lug 52 cooperates with a slot 54 of corresponding size provided in the cover 17 in the vicinity of the rear end 55 thereof. The lug 53 cooperates with a passage 56 provided in the cover 17 opposite the slot 54 and in the vicinity of the end 55.

The passage 56 comprises a main portion 57 whose width corresponds to that of the bar 51. The main portion 57 of the passage 56 is extended towards the end 55 of the cover 17 by two successive narrowed parts 58 and 59. The narrowed part 58 of the passage 56 is separated from the main portion 57 by a shoulder 60, whereas the narrowed part 59 is separated from the narrowed part 58 by a shoulder 61. The width of the narrowed part 58 corresponds to that of the lug 53 which is thus able to abut against the shoulder 61.

Between the bar 51 and the rear end 22 of the support 21 there are provided connecting means of adjustable length, these means comprising two longitudinal parallel screws 62. Each screw 62 is designed so as to be able to pass through the narrowed part 59. Each screw 62 passes through a hole 63 in the rear end 22 of the support 21 and has a head 64 designed to be applied against this end 22. Each screw 62 is designed to be screwed into a threaded hole 65 in the bar 51.

The body 17 is mounted on the support 21 in an extremely simple manner by means of the lockable attachment means 50.

The screws 62 are placed in the holes 63 and they are screwed slightly into the bar 51 at 65. The assembly 62, 51 carried by the support 21 is fitted back into the cover 17 by inserting the bar 51 into the main portion 57 of the passage 56, in the course of which the screws 62 pass through the narrowed part 59 (FIG. 6).

The lug 52 is inserted into the slot 54 and by screwing the screws 62 into the threaded holes 65 the bar 51 is moved back, so that the lug 53 engages in the part 58 until abutting against the shoulder 61. By tightening the longitudinal screws 62, the assembly is securely attached without any play (FIG. 7).

Disassembly is carried out equally simply by following the reverse procedure.

It will be noted that the main portion 57 of the passage 56 serves for the installation of the electrical flex 13 for the supply to the heating element 10.

The shielding function of the present invention will now be described by way of a numerical example.

The heating element 10 which operates at 700° C. is the initial source of radiation. The cover 17 acts as a first shield which in turn radiates heat at 500° C. The radiation from the cover 17 encounters a second shield, the first portion 26 of the bent bracket member, which heats to 150° C. and in turn radiates heat. The radiation given off by the portion 26 encounters a third shield in the form of the second portion 28 of the bent bracket member which heats to 70° C.; the radiation emitted from the second portion 28 is in turn extremely reduced.

Heat is conducted successively along the length of the cover 17 from its front to its rear end, then along the first portion 26 of the bracket member and finally along the length of the portion 28 before reaching the handle. Advantage is thus taken of the heat losses along the long conductive path to dissipate the heat conducted to the handle.

The result of the shielding and the heat losses along the conductive path is that the temperature of the handle 12 rises only to about 30° C. in operation, which is also the temperature of the support rest.

The present invention is not limited to the specific embodiments described herein but, on the contrary, is intended to cover all modifications, variations and expedients within the scope of the appended claims.

What we claim is:

1. A hand tool for heating a workpiece comprising an elongate electric heating element, a heat applying member conductively connected to one end of the heating element and in alignment with the longitudinal axis thereof, an elongate cover member extending in spaced relation around and generally parallel to the heating element, means for securing said heating element and said heat applying member to one end of said cover member with said heat applying member extending outwardly of said cover member, said securing means defining the sole heat conductive connection therebetween, a handle disposed generally at right angles to the cover member, a relatively wide, bent bracket member connected to said handle and connected in heat conductive contact with said cover member solely at the opposite end of said cover member, said cover member being adapted to dissipate heat along its length from said one end to said opposite end, said bracket member being arranged to form a shield between said cover member and handle, whereby said cover member and said bracket member shield said handle from heat generated by said heating means when said hand tool is in operation, said bracket member comprising spaced, parallel elongated first and second portions, each substantially coextensive with said cover member, said first and second portions having a width at least as great as the width of said cover member and being joined together at one end in a hairpin configuration, said first portion lying in lateral spaced relation beneath and parallel to said cover member and having its other end secured to said cover member at said opposite end of the cover member, said handle being secured to the other end of said second portion, said handle extending substantially at right angles to said second portion.

2. The hand tool according to claim 1, comprising clamp mounting means for securing the handle to said second portion.

3. The hand tool according to claim 1, wherein an electrical lead for supplying the heating element with electric power passes through holes in the first and second portions of the bracket member and in the cover member, the portion of the lead extending between the first and second portions running, over a substantial length, generally parallel thereto.

4. The hand tool according to claim 1, the other end of the second portion extending beyond said handle so as to form a curved support rest.

5. The hand tool according to claim 1, wherein said bracket member is formed from a bent metal strip and the ratio of the width to the thickness of the metal strip is in the range of 12:1 to 17:1.

6. The hand tool according to claim 5, wherein the width of the metal strip is about 50 mm and its thickness about 3 to 4 mm.

7. The hand tool according to claim 1, wherein means detachable independently of the heating element and the heat applying member secures the bracket member to the cover member.

8. The hand tool according to claim 7, wherein said securing means comprises screw fasteners interconnecting a ring fixed to said bracket member to said opposed end of said cover member.

9. The hand tool according to claim 1, wherein detachable attachment means secures said bracket member to said cover member.

10. The hand tool according to claim 9, wherein said detachable attachment means comprises a small diametral bar having lugs at its ends cooperable with a diametrically opposed slot and passage in said opposite end of the cover member, said passage having two consecutively narrowed parts, the larger of which snugly receives a said lug, said slot snugly receiving the other said lug, and connecting means adjustable in length, between the bar and said bracket member.

11. The hand tool according to claim 10, wherein the narrow parts of said passage define shoulders against which the first-mentioned lug abuts.

12. The hand tool according to claim 10, wherein the connecting means comprises parallel longitudinal screws.

13. The hand tool according to claim 12, wherein an electrical cord is electrically connected to said heating element, said electrical cord passing through said passage.

* * * * *